United States Patent
Thomson et al.

(10) Patent No.: US 6,681,284 B1
(45) Date of Patent: Jan. 20, 2004

(54) SYSTEM AND METHOD FOR PROVIDING A SERIAL BUS INTERFACE USING DISTRIBUTED DRIVER EXECUTION

(75) Inventors: Andrew Thomson, Austin, TX (US); Khasid Ali Khan, Austin, TX (US); Eric Singer, Austin, TX (US); Daniel Liu, Austin, TX (US); Mark Gruetzner, Lincoln, TX (US)

(73) Assignee: National Instruments Corporation, Austin, TX (US)

( * ) Notice: Subject to any disclaimer, the term of this patent is extended or adjusted under 35 U.S.C. 154(b) by 454 days.

(21) Appl. No.: 09/723,552

(22) Filed: Nov. 27, 2000

(51) Int. Cl.[7] ............................................... G06F 13/14
(52) U.S. Cl. ...................................... 710/305; 709/301
(58) Field of Search ........................ 710/305, 62, 100, 710/72, 300, 63, 313, 2; 714/1, 48; 463/42; 370/465; 361/683; 709/253, 301, 302

(56) References Cited

U.S. PATENT DOCUMENTS

| | | | |
|---|---|---|---|
| 5,204,669 A | * | 4/1993 | Dorfe et al. |
| 5,568,481 A | * | 10/1996 | Oh |
| 5,987,530 A | | 11/1999 | Thomson |
| 6,073,205 A | | 6/2000 | Thomson |
| 6,085,265 A | * | 7/2000 | Kou |
| 6,263,392 B1 | * | 7/2001 | McCauley |
| 6,415,342 B1 | * | 7/2002 | Wahl et al. |

OTHER PUBLICATIONS

National Instruments 1997 Instrumentation Reference and Catalogue, pp. 4–75 through 4–77.
National Instruments 1999 Measurement and Automation Catalogue, pp. 742 and 743.

\* cited by examiner

Primary Examiner—Gopal C. Ray
(74) Attorney, Agent, or Firm—Meyertons Hood Kivlin Kowert & Goetzel, P.C.; Jeffrey C. Hood (57) ABSTRACT

A system and method for communicating with a device over an external transmission medium. The system may include a host computer system, including a user application, a serial bus interface driver, and a first portion of an interface driver. The host computer may include a serial bus host controller. A serial bus may couple the serial bus host controller to a serial bus interface, which may include an interface connector adapted to couple to the device, wherein the serial bus interface may be operable to store and execute a second portion of the interface driver. When the user application generates an API function call, the first portion of the interface driver may generate a frame of interface commands that are transferred to the second portion of the interface driver for execution, thereby causing signals to be transmitted over an interface bus to the device.

56 Claims, 8 Drawing Sheets

SYSTEM AND METHOD FOR PROVIDING A SERIAL BUS INTERFACE USING DISTRIBUTED DRIVER EXECUTION

BACKGROUND OF THE INVENTION

1. Field of the Invention

This invention relates to data communications and data delivery over communication media between a host computer and a device, such as in host computer-based measurement systems.

2. Description of the Related Art

In many applications it is necessary or desirable for a host computer system to communicate data with an external device. Various transmission media and protocols exist for enabling communication between a host computer system and an external device. Examples of these types of external transmission media include the Universal Serial Bus (USB), IEEE 1394, and other serial or parallel buses which enable communication, e.g., packet-based communication. Typically, the host computer system includes communication logic for interfacing with the external communication line. For example, in a computer system which includes USB communication capabilities, the computer system typically includes a USB host controller for communication with the USB. The computer system also typically includes various layers of driver software which allow an application to interface with and use the external communication media for communicating with the external device.

In some systems serial interface hardware may be used to facilitate communication between the host computer and the external device. As one example, USB systems may include a remote USB hub for coupling to various USB devices. As another example, the host computer may communicate over the USB with a serial interface, wherein the serial interface in turn communicates with the external device according to a different interface or bus standard. For example, the host computer may communicate over the USB with a serial interface, which in turn may communicate with a GPIB device over a General Purpose Interface Bus (GPIB).

One problem that often arises with host computer driver software which is used to interface to an external communication medium is that the driver software requires numerous context switches between user mode and kernel mode. As is well known in the art, a user mode/kernel mode transition requires a context switch by the CPU, which generally requires a large amount of CPU resources or cycles. Therefore, it would be desirable to provide a driver implementation which is operable to communicate with an external communication medium that minimizes user mode/kernel mode transitions.

Additionally, communication of commands to the device may involve significant overhead. For example, in a typical USB system the transfer of a single low level command may take as long as 3 ms. If a high level command involves 20 low level commands transferred over the bus, an overhead of 60 ms may accrue. Therefore, it would be desirable to provide a driver implementation which minimizes transfer overhead.

Figure 1:
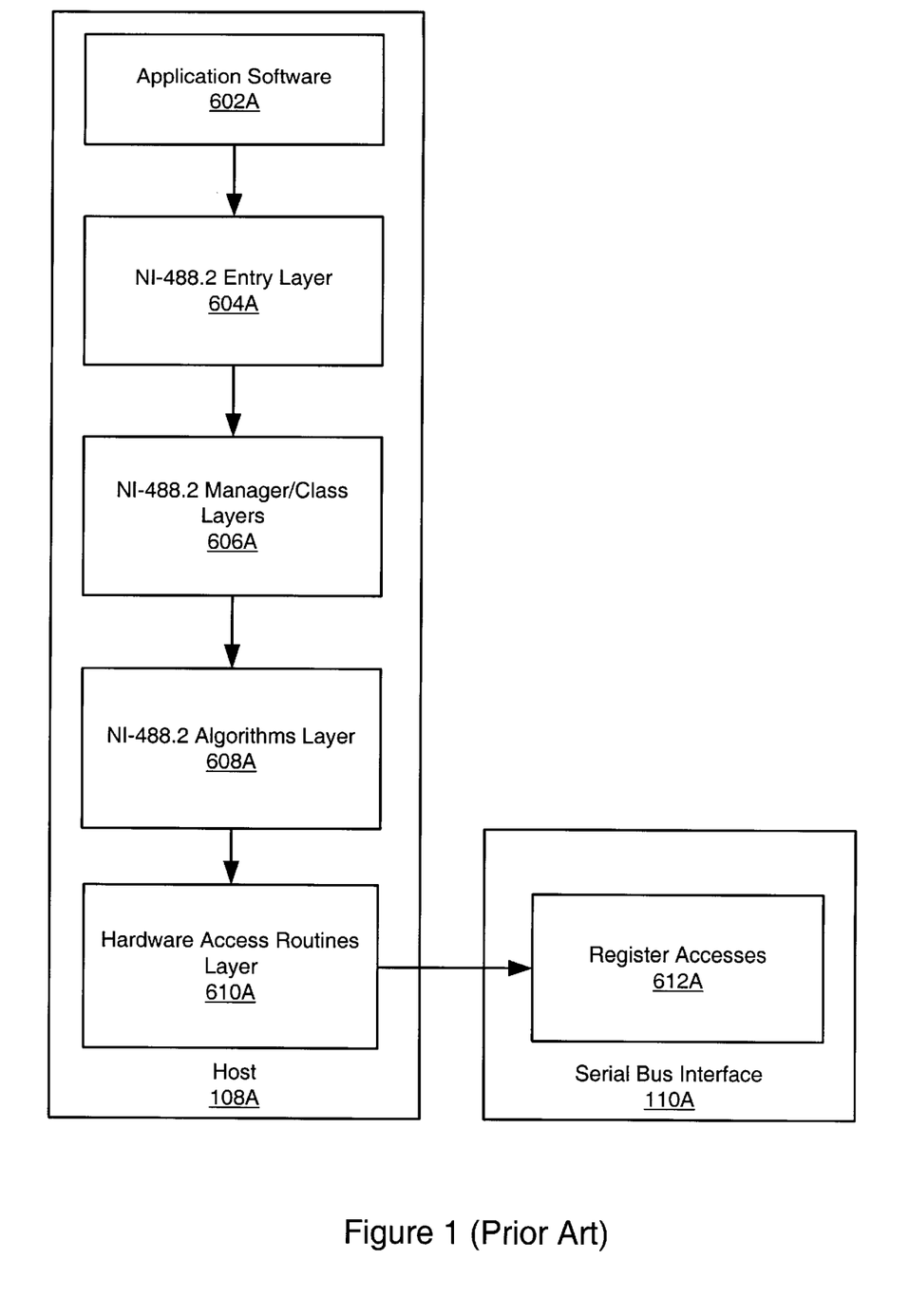
FIGS. 1 and 2 illustrate the software architecture of prior art systems.

FIG. 1: Remote Interface—Driver Executes Completely on the Host Computer

FIG. 1 illustrates the software architecture of prior art systems referred to as the GPIB-USB and the GPIB-1284CT from National Instruments Corporation. This software architecture operates in a system that includes a serial bus interface 110A (or parallel port in the case of the 1284CT) for communicating with an external device. The software architecture of FIG. 1 presumes a host computer 108A communicating with the external serial bus interface device 110A. The software architecture includes application software 602A and a software driver. As shown, the software driver is implemented in multiple software layers for modularity. The driver software layers include driver entry layer 604A, driver manager/class layers 606A, driver algorithms layer 608A and hardware access routines layer 610A. The block labeled "Register Accesses 612A" represents the hardware registers on the serial bus interface 110A, i.e., the accesses that are performed on the serial bus interface 110A by the hardware access routines layer 610A.

As FIG. 1 shows, host 108A stores and executes application software 602A, driver entry layer 604A, driver manager/class layer 606A, driver algorithms layer 608A, and driver hardware access routines 610A. The driver hardware access routines 610A perform individual low level register accesses across the serial bus to the serial interface 110A, as represented by driver register accesses 612A. In this approach, the entire driver comprising blocks, 604, 606, 608 and 610 executes on the host computer 108A, and the host system communicates with the serial bus interface 110A using low level register accesses, i.e., register reads and writes.

In the prior art GPIB-USB system, the application software 602 and the driver software operate as follows. Application software 602A may communicate with a driver entry layer 604A, such as National Instruments NM-488.2 Entry layer, which provides an entry point for application communication with the device. The entry layer presents an Application Programming Interface (API) to the application for interacting with the interface driver and serializing calls to the driver. The entry layer 604A in turn communicates with manager/class driver software 606A, such as National Instruments NI-488.2 Manager/Class layers, which determines to which hardware to send the communications, and which is responsible for reading configuration information for a board/device from persistent storage and passing these settings down the driver stack. The Class layer has GPIB board and device software objects with methods that correspond to most of the user callable NI-488.2 functions. These objects are initialized with the board/device settings passed down from the Manager layer.

The manager/class driver software communicates with a driver algorithm layer 608A, such as National Instruments NI-488.2 Algorithms layer, which provides higher level control structures, such as looping, for controlling the device. The algorithms layer 608A communicates with hardware access routines layer 610A, which in turn, performs individual low level register accesses 612A across the serial bus to the interface 110A. As can be seen, the entire driver functionality is located on the host computer 108A. Thus, the interface device 110A is a "dumb" device, and hence a less expensive device. The host computer 108A was required to send each individual register access command over the bus one at a time and make sure the command completed successfully before sending the next one. This approach to the driver implementation results in low performance, in that each individual register access by the driver software must be transmitted over the bus one at a time, and thus the overhead associated with the transfers accumulates rapidly.

In this prior art GPIB-USB system, the driver software and/or the USB device included various novel features to improve the speed and efficiency of transfers. For example, the GPIB-USB system implemented read pre-fetching/caching and write posting techniques to improve performance. For more information on these techniques, please see U.S. Pat. Nos. 5,987,530 and 6,073,025.

Figure 2:
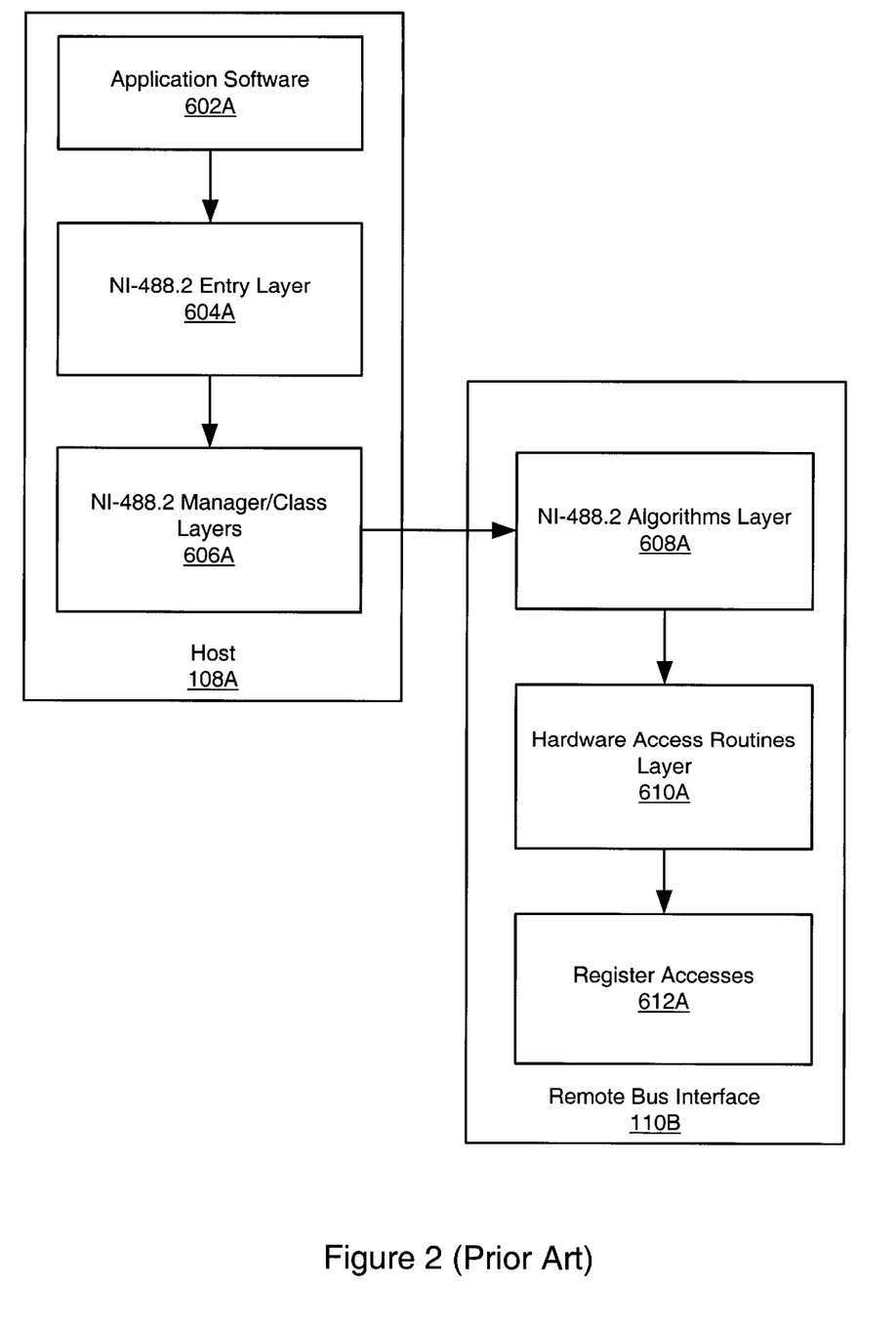

FIG. 2: Driver Executes Completely on the Remote Interface

FIG. 2 illustrates an alternate software architecture according to the prior art. The software architecture of the system of FIG. 2 attempts to address the above problems of bus transaction overhead by locating and executing a large portion of the driver (essentially the entire driver) in the remote interface 110B. FIG. 2 illustrates the software architecture of a prior art system, referred to as the GPIB-ENET product from National Instruments. The GPIB-ENET product is an Ethernet to GPIB converter interface for converting between Ethernet packets and GPIB packets. In the software architecture of FIG. 2, substantially all of the GPIB driver executes in the remote interface 110B.

As FIG. 2 shows, host 108A stores and executes application software 602A, driver entry layer 604A, and driver manager/class layer 606A. The remote bus interface 110B stores and executes driver algorithms layer 608A and driver hardware access routines 610A, which execute to perform driver register accesses 612A. In this approach the host system 108A communicates with the bus interface 110B using high-level frames.

Application software 602A may communicate with the driver entry layer 604A, and the driver entry layer 604A in turn communicates with the manager/class driver software 606A.

The manager/class driver software 606A communicates (over the Ethernet bus) with the driver algorithm layer 608A. As noted above, the driver algorithm layer 608A provides higher level control structures, such as looping, for controlling the device. The algorithms layer 608A executing on the remote bus interface communicates with hardware access routines layer 610A, which in turn performs register accesses 612A on the interface 110B.

As can be seen, the bulk of the driver functionality is located on the remote interface, which requires that the remote interface 110B have sufficient memory and processing power to execute the driver software. However, providing these resources on the bus interface 110B involves significant cost to the interface 110B. Therefore, the driver software architecture of FIG. 2 enables high level commands to be sent over the Ethernet bus to the interface 110B, thus reducing bus overhead. However, due to the large processor and memory requirements, primarily the requirements related to executing the algorithms layer 608A, the interface 110B is relatively expensive.

Therefore, an improved method and system for communication between a host computer and an external device is desired.

SUMMARY OF THE INVENTION

The present invention comprises various embodiments of a system and method for communicating with a device over an external transmission medium. In one embodiment, the system may comprise a host computer system which couples through a serial bus to an external serial bus interface. The serial bus interface may in turn couple through an interface bus to the device.

The host computer system may include a host CPU and a host memory, wherein the host memory may store and execute a user application, a serial bus interface driver, and a first portion of an interface driver. The host computer may further include a serial bus host controller. The serial bus host controller of the host computer may couple to the serial bus. The serial bus interface couples to the serial bus and may include an interface connector adapted to couple through the interface bus to the device. The serial bus interface may be operable to execute a second portion of the interface driver, and the serial bus interface may be operable to communicate signals over the interface bus to the device in response to the execution of the second portion of the interface driver.

In one embodiment the host computer system stores and executes one or more layers of the interface driver software, including the algorithm layer of the interface driver, and the serial bus interface executes hardware access routines for accessing the hardware registers on the serial bus interface. Thus, in one embodiment the second portion of the interface driver may include primarily only hardware access routines (register access routines), may include limited hardware configuration information, and may not include higher level interface algorithms. Thus, the serial bus interface may include a relatively inexpensive processor and a relatively small amount of memory, and accordingly the serial bus interface may be relatively inexpensive. In addition, the first driver portion executing on the host computer may operate to package up related low level commands into a single frame or packet and provide this single frame or packet to the serial bus interface in a single transfer. The first driver portion executing on the host computer may further operate to package up related low level commands into a single frame using only a single user mode/kernel mode context switch. Thus, this embodiment may operate to provide a relatively inexpensive serial bus interface while providing the advantages of reduced bus transactions and reduced user mode/kernel mode context switches.

In one embodiment, the method operates as follows. First, the user application may generate an API function call to the interface driver. The first portion of the interface driver executing on the host computer receives the API function call, generates a plurality of low level interface commands based on the API function call, and generates a frame encapsulating the plurality of low level interface commands. The first portion of the interface driver may generate the frame encapsulating the plurality of interface commands with a reduced number of user mode/kernel mode transitions, e.g., only one user mode/kernel mode transition. The serial bus host controller may then send the frame over the serial bus in a single bus transfer to the serial bus interface. The serial bus interface may then execute the second portion of the interface driver to execute the plurality of interface commands comprised in the frame. In one embodiment, in executing the second portion of the interface driver, the serial bus interface executes hardware access routines for unpacking the frame to retrieve the plurality of interface commands and executing the commands to read/write registers on the serial bus interface. The serial bus interface may then transmit signals or commands over the interface bus to the device in response to executing the plurality of interface commands.

In one embodiment the serial bus may be a Universal Serial Bus (USB), the serial bus host controller may be a USB host controller, and the serial bus interface driver may be a USB driver. In one embodiment, the interface bus may be a General Purpose Interface Bus (GPIB) for connecting to a GPIB device, and the serial bus interface may perform serial bus to GPIB bus conversions. Hence the first portion of the interface driver executing on the host and the second portion of the interface driver executing on the serial bus interface may comprise a first portion of a GPIB driver and a second portion of a GPIB driver, respectively.

In an alternate embodiment, the system may comprise a host computer system which couples through a bus, such as a serial bus, to a device, wherein the host computer system executes a first portion of a device driver for communicating with the device and the device executes a second portion of the device driver. In this embodiment, the host computer system executes one or more layers of the device driver, including the algorithms layer of the device driver, and the device executes hardware access routines for accessing the hardware registers on the device. Thus, as with the embodiment described above, the device may include a relatively inexpensive processor and a relatively small amount of memory, and accordingly the device may be relatively inexpensive. In addition, the first driver portion executing on the host computer may operate to package up related low level commands into a single frame or packet and provide this single frame or packet to the device in a single transfer. The first driver portion executing on the host computer may further operate to package up related low level commands into a single frame using only a single user mode/kernel mode context switch. Thus, this embodiment may operate to provide a relatively inexpensive device while providing the advantages of reduced bus transactions and reduced user mode/kernel mode context switches.

BRIEF DESCRIPTION OF THE DRAWINGS

Other advantages and details of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Figure 3:
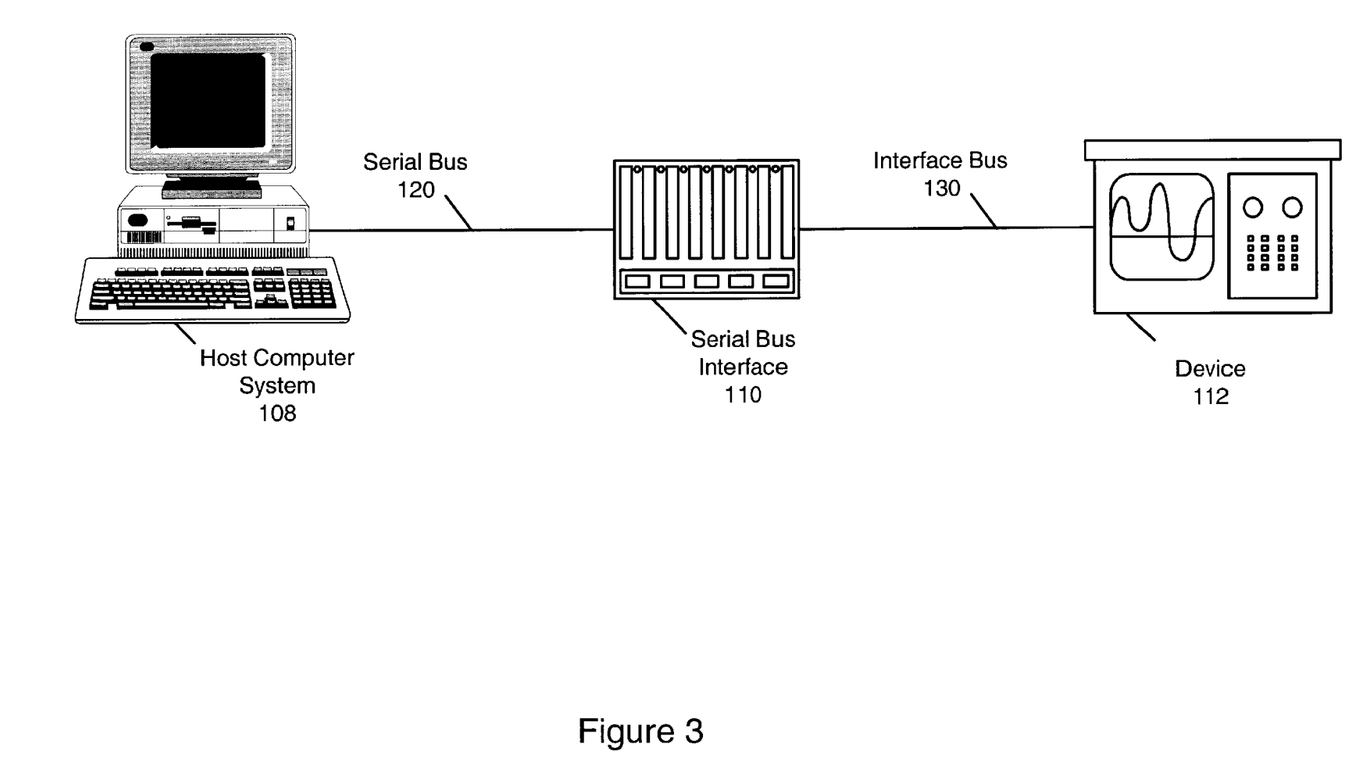
FIG. 3 illustrates a system according to one embodiment, wherein the system includes a host computer which couples to a serial bus interface, wherein the serial bus interface interfaces to a device.

FIG. 3: Measurement System With Serial Bus Interface

FIG. 3 illustrates a measurement system according to one embodiment. It is noted that the present invention may be used in various types of systems where a host computer communicates with an external device. Exemplary systems include data acquisition systems, test and measurement systems, industrial automation systems, process control systems, multimedia systems, machine vision systems and other types of systems. In the preferred embodiment described below, the device is a measurement or data acquisition (DAQ) device, and the system is a computer-based measurement system.

As FIG. 3 shows, a host computer system 108 may be coupled through a communication medium, e.g., a serial bus 120, to a bus interface, e.g., serial bus interface 110, which may be further coupled to a device 112 through an interface bus 130. The serial bus interface 110 operates to perform serial bus to interface bus conversions to allow communication between the host computer 108 and the device 112. In one embodiment, the bus 120 is a parallel bus, and the bus interface 110 is a parallel bus interface.

In a preferred embodiment, the serial bus 120 may be a Universal Serial Bus (USB), such as described in the current or future USB protocol specifications, although in other embodiments the bus may implement other serial protocols such as IEEE 1394, or any other serial or parallel communication protocol. The following describes one embodiment of the present invention which uses the USB, although it is noted that the invention may be used with any of various serial or parallel communication media.

In one embodiment, the device 112 may be a measurement device or data acquisition (DAQ) device, which may be operable to collect data concerning pressure, temperature, chemical content, current, resistance, voltage, audio or image data, or any other detectable attribute. The device 112 may also include data generation capabilities. In the preferred embodiment, the device 112 is a GPIB (General Purpose Interface Bus) instrument. The device 112 may also be an image acquisition device, a machine vision device, an industrial automation device, or any type of device.

The host computer system 108 may be operable to control the device 112 by sending requests to read from or write to the device's memory registers, or by sending high level commands to the device 112. The host computer system 108 may be further operable to obtain data from the device 112 for storage and analysis on the host computer system 108, either by issuing read requests or by programming the device 112 to send data to the memory of the host computer 108. In the preferred embodiment, the host computer system 108 communicates with the device 112 by sending serial bus interface commands to the serial bus interface 110, wherein the serial bus interface 110 converts the serial bus commands into commands on the interface bus 130. In a similar manner, the serial bus interface 110 may receive data and/or commands from the device 112 and provide corresponding frames on the serial bus 120 to the host computer 108.

The host computer 108 preferably includes a memory medium on which computer programs of the present invention may be stored, and a processor which is operable to execute the computer programs. In a similar manner, the serial bus interface 110 preferably includes a memory medium on which computer programs of the present invention may be stored, and a processor which is operable to execute the computer programs. The system may include a software architecture similar to that shown in FIG. 6. In one embodiment of the present invention, the host computer 108 stores and executes a first portion of an interface driver, and the serial bus interface 110 stores and executes a second portion of the interface driver.

Figure 4:
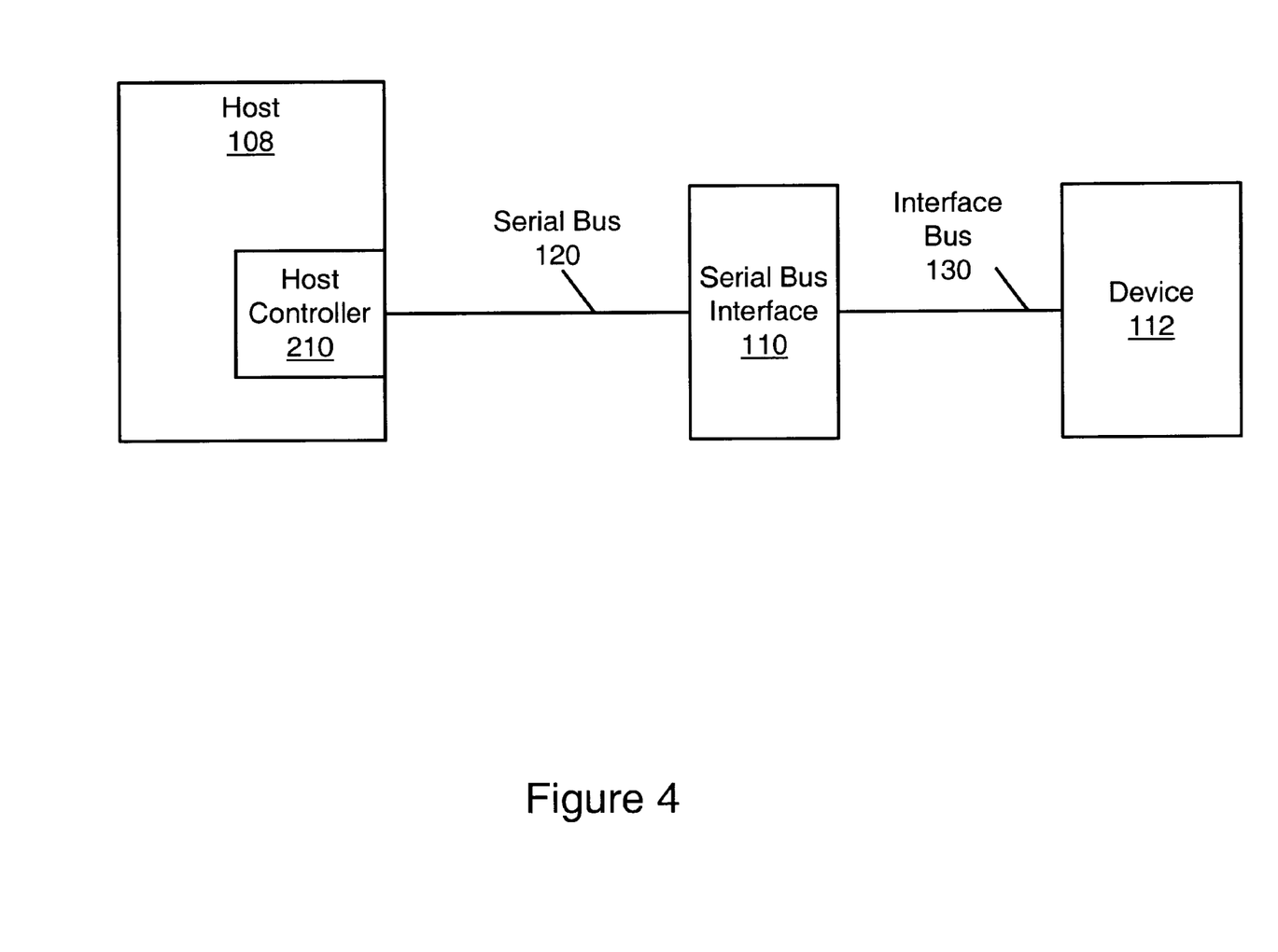
FIG. 4 is a block diagram of the system of FIG. 3.

FIG. 4: Block Diagram of the Measurement System With Serial Bus Interface

FIG. 4 is block diagram of the system of FIG. 3. As FIG. 4 shows, the host computer 108 may include a serial bus host controller 210 which is operable to provide an interface between the host computer 108 and the serial bus 120. In one embodiment, the serial bus may be a USB, and the serial bus host controller 210 may be a USB host controller. In one embodiment, the host computer (host) 108 may include serial bus driver software to facilitate communication between the host 108 and the serial bus interface 110. As noted above, the host computer 108 may also store a first portion of an interface driver. The architecture of the interface driver software is described below with reference to FIG. 6.

Figure 5:
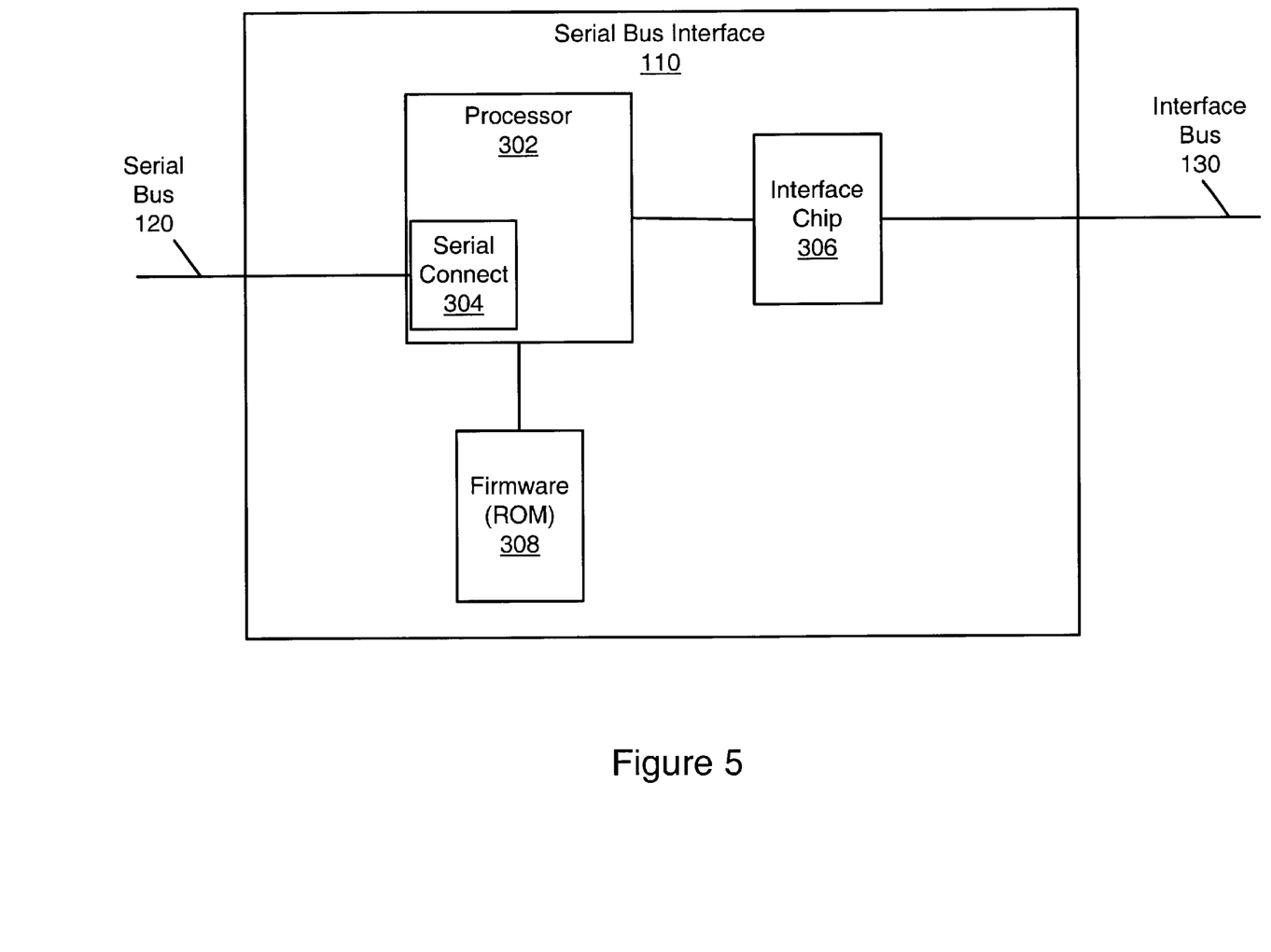
FIG. 5 is block diagram of the serial bus interface, according to one embodiment.

FIG. 5: Block Diagram of the Serial Bus Interface

FIG. 5 is a block diagram of the serial bus interface 110, according to one embodiment. As FIG. 5 shows, serial bus interface 110 may include a processor 302, serial bus connect 304, firmware 308 and interface chip 306. The serial bus 120 may couple to processor 302 through serial connect 304. The processor 302 may be coupled to firmware 308. The firmware 308 preferably comprises the second portion of the serial bus driver program which may be executed by the processor. In one embodiment, the firmware may also comprise configuration data. The processor 302 may be further coupled to the interface chip 306 which in turn couples to the interface bus 130. As shown in FIGS. 3 and 4 above, the interface bus 130 may couple to the device 112. In one embodiment, the interface chip 306 may be operable to convert commands generated by the second portion of the interface driver software (executing on the processor 302) to a format suitable for transmission over the interface bus 130 to the device 112. In the preferred embodiment, the interface bus 130 is the GPIB, and the interface chip 306 provides a GPIB interface. The interface chip 306 is preferably the TNT4882C chip from National Instruments Corporation. The interface processor chip 302 is preferably the Intel 8x930AX, which is an inexpensive processor. The firmware 308 is preferably the ATMEL 27LV256A and preferably comprises only 32 kbytes.

Figure 6:
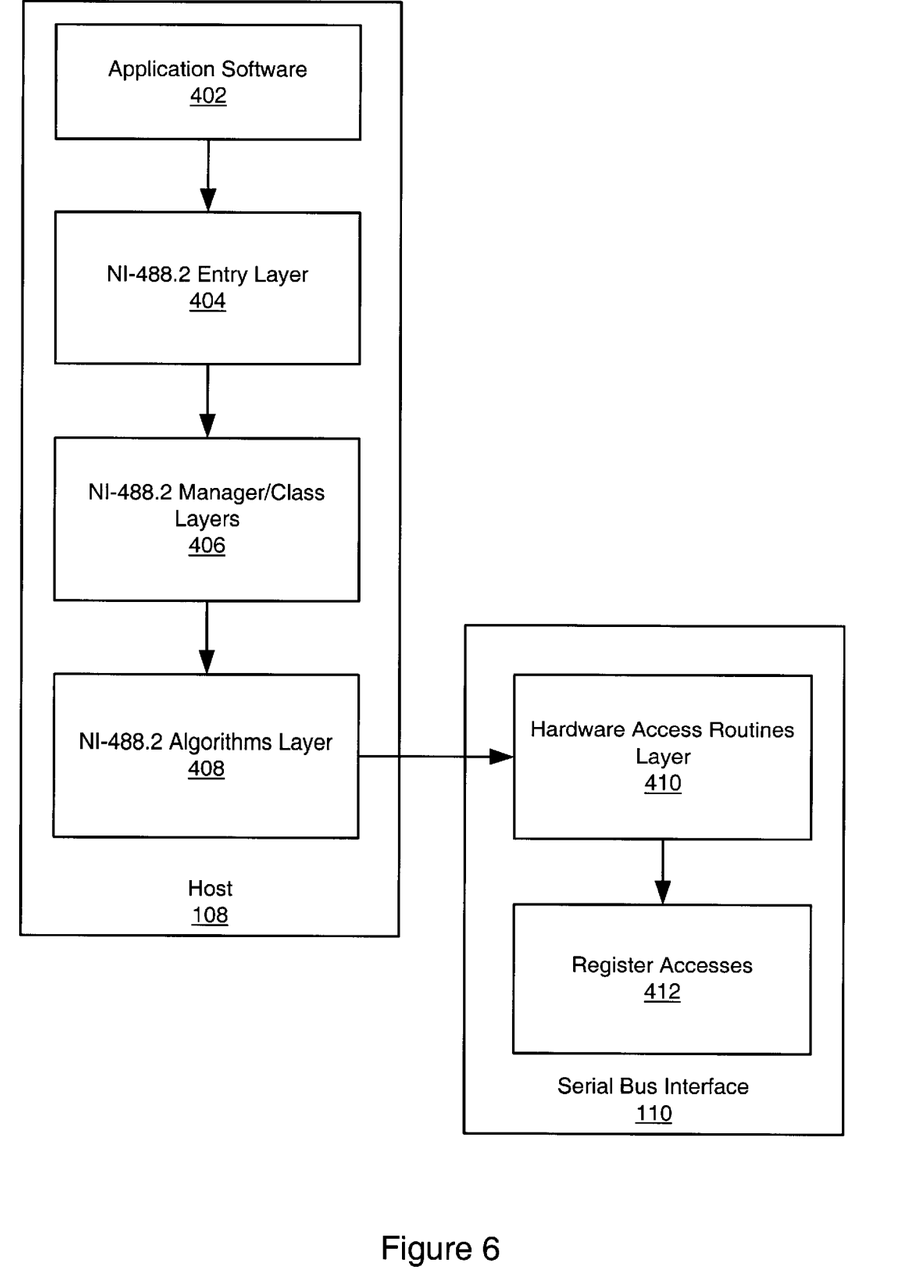
FIG. 6 illustrates the software architecture of the system, according to one embodiment.

FIG. 6: System Software Architecture

FIG. 6 illustrates a software architecture of the system, according to one embodiment. The software architecture includes application software 402 and interface driver software comprising blocks 404–410. Block 412 represents the hardware registers in the serial bus interface 110, i.e., represents the accesses to the hardware registers.

The interface driver may be implemented in multiple software layers for modularity. The driver software layers may include driver entry layer 404, driver manager/class layer 406, driver algorithms layer 408 and hardware access routines layer 410. As FIG. 4 shows, host 108 may store and execute application software 402, and a first portion of the interface driver comprising driver entry layer 404, driver manager/class layer 406, and driver algorithms layer 408. The remote serial bus interface 110 may store and execute a second portion of the interface driver comprising hardware access routines layer 410.

The driver algorithms layer 408 comprises high level routines to perform desired algorithmic operations, such as looping and branching, to control the operation of the device. Such control operations may require substantial processing resources and memory to execute compared with the simple low level commands executed by the hardware access routines layer 410 in the interface 110 to control the device 112. By storing and executing the driver algorithms layer 408 on the host computer 108, and primarily only executing the hardware access routines layer 410 on the serial bus interface 110, the serial bus interface 110 components may be relatively inexpensive as noted above.

In this system the host system 108 may communicate with the serial bus interface 110 using frames which encapsulate a number of low level commands. The first portion of the interface driver, comprising blocks 404, 406 and 408, execute to pack a plurality of low level commands into a frame, and the second portion of the interface driver, comprising block 410, executes on the serial bus interface 110 to unpack the frames into their constituent low level commands and execute these low level commands to access (read/write) registers on the serial bus interface 110. Reads and writes to registers on the serial bus interface 110 cause the serial bus interface 110 to control or communicate with the device 112.

Although not shown, the system may also include serial driver bus software executing on the host computer 108 for communication with the serial host controller 210. This may comprise standard USB drivers.

In the preferred embodiment, the device 112 is a GPIB instrument, and the interface driver shown in FIG. 6 is a GPIB/IEEE 488.2 driver, preferably the NI-488.2 driver from National Instruments Corporation. However, it is noted that the GPIB/488.2driver shown is one embodiment, and that the system may be implemented in various embodiments which include other interface types, drivers and protocols. The following comprises more detail regarding the various layers of the GPIB/488.2 interface driver used in the preferred embodiment.

Application software 402 may communicate with a driver entry layer 404, such as National Instruments NI-488.2 Entry, which may provide an entry point for application communication with the device. The entry layer may present an API to the application for interacting with the interface driver and serialize calls to the driver. The entry layer 404 in turn may communicate with manager/class driver software 406, such as National Instruments NI-488.2 Manager/Class layers. The manager layer may determine to which hardware to send the communications, and may be responsible for reading configuration information for a board/device from persistent storage and passing these settings down the driver stack. The class layer may have GPIB board and device software objects with methods that correspond to most of the user callable NI-488.2 functions. These objects may be initialized with the board/device settings passed down from the manager layer. The manager/class driver software may communicate with a driver algorithm layer 408, such as National Instruments NI-488.2 Algorithms layer. The Algorithms layer 408 provides higher level control structures, such as looping and branching, for controlling the operation of the device.

The algorithms layer 408 may communicate frames over the serial bus 120 to hardware access routines layer 410. Hardware access routines layer 410 executes on the serial bus interface 110. Finally, the hardware access routines layer 410 may communicate with registers 412 on the serial bus interface 110, which causes signals or commands to be provided to the device 112.

Therefore, in one embodiment the host computer system stores and executes one or more layers of the interface driver software, e.g., layers 404, 406, and 408, and the serial bus interface executes hardware access routines layer 410 for accessing the hardware registers on the serial bus interface. Thus, in one embodiment the second portion of the interface driver may include primarily only hardware access routines layer 410 (register access routines), may include only limited hardware configuration information, and preferably does not include higher level interface algorithms.

The limited hardware configuration information stored in the hardware access routines layer 410 may comprise information such as its own GPIB address, as well as hardware configuration information for autopolling, such as addresses of other GPIB devices. The hardware access routines layer 410 preferably does not store any other information regarding other GPIB devices, i.e., the limited hardware configuration information preferably does not contain other information regarding other GPIB devices.

Figure 7:
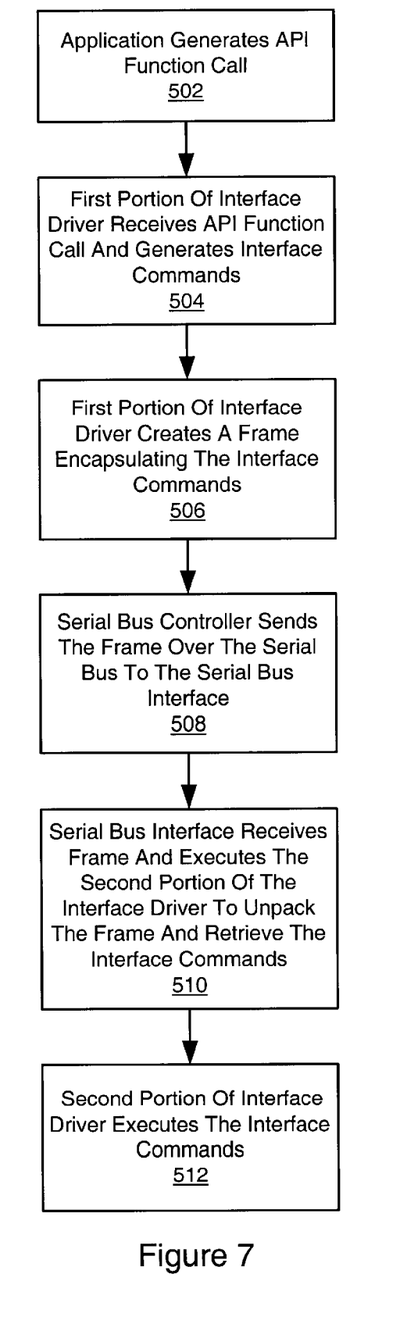
FIG. 7 is a flowchart of the communication process, according to one embodiment.

FIG. 7: Serial Bus Interface Communication Process

FIG. 7 is a flowchart of the communication process using the serial bus interface 110, according to one embodiment. As FIG. 7 shows, in 502 the application 402 (executing on the host computer system) may generate an API function call related to controlling or communicating with the device 112, or for programming the serial bus interface 110 to communicate with the device 112.

In 504 a first portion of the interface driver (which may comprise blocks 404, 406 and 408) may receive the API function call from the application and generate a plurality of low level interface commands (also referred to as "sub-commands") to implement the API function. In one embodiment, the API may be the NI-488.2 API provided by National Instruments, through which the application may interface with the device hardware. In one embodiment, the application may use interactive control tools such as IBIC (an Interactive Control Utility) also from National Instruments which communicates directly with the driver by exporting the API to the user. In another embodiment, the application may use language interfaces such as provided by National Instruments which encapsulate the API function calls and are callable from inside the application.

In 506 the first portion of the interface driver may create a frame which encapsulates the plurality of low level interface commands. In this manner, a relatively large group of commands may be packaged as a single object or frame for transfer over the serial bus 120 to the serial bus interface 110.

Whenever user application software 402 makes a call to the hardware, i.e., a call to communicate with the serial bus interface 110 or the device 112, a transition from user mode to kernel mode is required. In the preferred embodiment, a layer of the first portion of the interface driver may execute in user mode to generate the plurality of low level interface commands, create the frame, and send the frame to a layer of the first portion of the interface driver which executes in kernel mode. The layer executing in kernel mode may then send the frame over the serial bus to the serial bus interface. In another embodiment, the layer executing in user mode may send the API function call to the layer executing in kernel mode, which may then generate the plurality of low level interface commands, create the frame, and send the frame over the serial bus to the interface. In both cases, only one user/kernel mode transition is required for the operation, i.e., one frame transfer involves one mode transition. Thus the number of user mode/kernel mode transitions may be greatly reduced as compared to prior systems which require a mode transition for each individual low level command.

In 508 the host controller 210 may send the frame generated by the first portion of the interface driver over the serial bus 120 to the serial bus interface 110. Sending the encapsulated plurality of interface commands over the serial bus 120 in a single frame transfer instead of many single command transfers may provide substantial performance gains by minimizing the overhead associated with transfers.

In 510 the serial bus interface 110 may receive the frame sent by the serial bus host controller 210, and execute a second portion of the interface driver to unpack the frame to obtain the plurality of interface commands.

Finally, in 512 the serial bus interface 110 may execute the second portion of the interface driver to execute the plurality of interface commands to access (read and/or write) registers on the serial bus interface 110. This operates to program the serial bus interface 110 to generate signals to communicate with or control the device 112 in a desired way.

It is noted that any of the "sub-commands" executed in step 512 may fail at the serial bus interface 110. If an error occurs during execution of a sub-command in step 512, the second portion of the interface driver executing on the serial bus interface 110 may prepare and send information to the host computer 108 to allow the host computer 108 to recover from the error. For example, the first portion of the interface driver may use this information to recover from the error. The second portion of the interface driver may monitor the bus state and send this information as well. If all of the "subcommands" executed successfully, then the second portion of the interface driver executing on the serial bus interface 110 may send back information indicating that all have "passed".

As one example of the operation of the present invention, presume the application generates a GPIB ibwrt command in step 502. In step 504 the first portion of the interface driver breaks up the ibwrt command into a sequence of subcommands, such as: send commands, which asserts ATN, configures hardware and transfers command bytes; send data, which deasserts ATN, configures hardware and transfers data bytes; etc. In step 506 the first portion of the interface driver creates a frame or packet and sends the frame or packet over the serial bus to the serial bus interface in step 508. The second portion of the interface driver can then unpack these commands in step 510 and execute each of these sub-commands in step 512. If any of these "sub-commands" executed in step 512 fail at the serial bus interface 110, the second portion of the interface driver executing on the serial bus interface 110 may prepare and send information to the host computer 108 to allow the host computer 108 to recover from the error.

Thus, by intelligently partitioning the driver software between the host computer 108 and the serial bus interface 110 such that the more expensive high level operations are performed by the host computer 108, the memory and processor requirements of the serial bus interface 110 are substantially reduced. Because of the small memory and processor requirements of the serial bus interface 110, implementing the above process may be accomplished at moderate expense. More specifically, the Intel 8x930AX interface processor chip costs approximately ten U.S. dollars, and the ATMEL 27LV256A firmware 308 typically costs less than two U.S. dollars. Thus the primary hardware of the system may cost in the ten's of dollars, as opposed to prior systems which may cost in the hundreds of dollars.

Additionally, user/kernel mode transitions are minimized by host-side driver software receiving high level API function calls from the application, and mapping each function call to lower level commands which are then packaged into a single frame using only a single user mode/kernel mode context switch. This avoids multiple user/kernel mode transitions which would occur if the commands were processed individually. Furthermore, overhead associated with the communication between the host computer system 108 and the device 112 may be substantially reduced over prior processes. Specifically, packaging a group of low level commands into a single frame for transfer to the interface 110 greatly reduces transfer overhead, as only one transfer is required compared to sending each command over the bus 120 individually.

Automatic Serial Polling (Autopolling)

The serial bus interface 110 may also be used to perform improved autopolling in a GPIB system according to one embodiment of the invention.

One function of a GPIB Controller is to detect and respond to service requests from GPIB devices on the bus. The Service Request Line (SRQ) on the GPIB is designed to signal the Controller when a service request is pending. When a GPIB device asserts the SRQ line to request service, the Controller must then determine which device asserted the SRQ line and respond accordingly. The most common method for SRQ detection and servicing is the serial poll. Serial polling is a method of obtaining specific information from GPIB devices when they request service. When the Controller conducts a serial poll, the Controller queries each device looking for the one that asserted SRQ. Each GPIB device responds to the poll by returning the value of its Status Byte.

Some GPIB driver software, such as NI-488.2 driver software programs, have an internal feature called Automatic Serial Polling or Autopolling. If Autopolling is active and the SRQ line goes high, the driver will automatically do the following: 1) begin serial polling each device that has been opened by ibfind or ibdev, stopping when the SRQ line goes low; 2) store the serial poll response status byte(s) in a memory queue for later retrieval; 3) set the RQS bit in the status word (ibsta) of each device that returned a status byte with Bit 6 set. The main advantage gained in using Autopolling is that devices requesting service are polled as quickly as possible.

The system of FIG. 3, the serial bus interface 110 is operable to perform autopolling. Thus, when a GPIB device such as device 112 asserts the SRQ line, the serial bus interface 110 performs autopolling, i.e., polls each of the GPIB devices 112 in turn and provides the results to the memory of the host computer 108. Referring to FIG. 6, the hardware access routines layer 410 comprised on the serial bus interface 110 operates to perform the autopolling. The layer 410 then provides the results to the host memory on the host computer 108. The NI-488.2 algorithms layer 408 operates to maintain the response queue and analyze the response queue to determine the results of the autopoll. Thus, the GPIB devices are polled relatively quickly, while the software intelligence which analyzes the queue resides on the host computer system 108. This provides an efficient memory method for performing autopolling utilizing the system of the present invention. Serial bus interface 110 preferably performs the autopolling algorithm and generates a queue where the responses are stored. These responses are then provided across the serial bus to the host computer 108. The NI-488.2 algorithms layer 408 analyzes the response queue.

Figure 8:
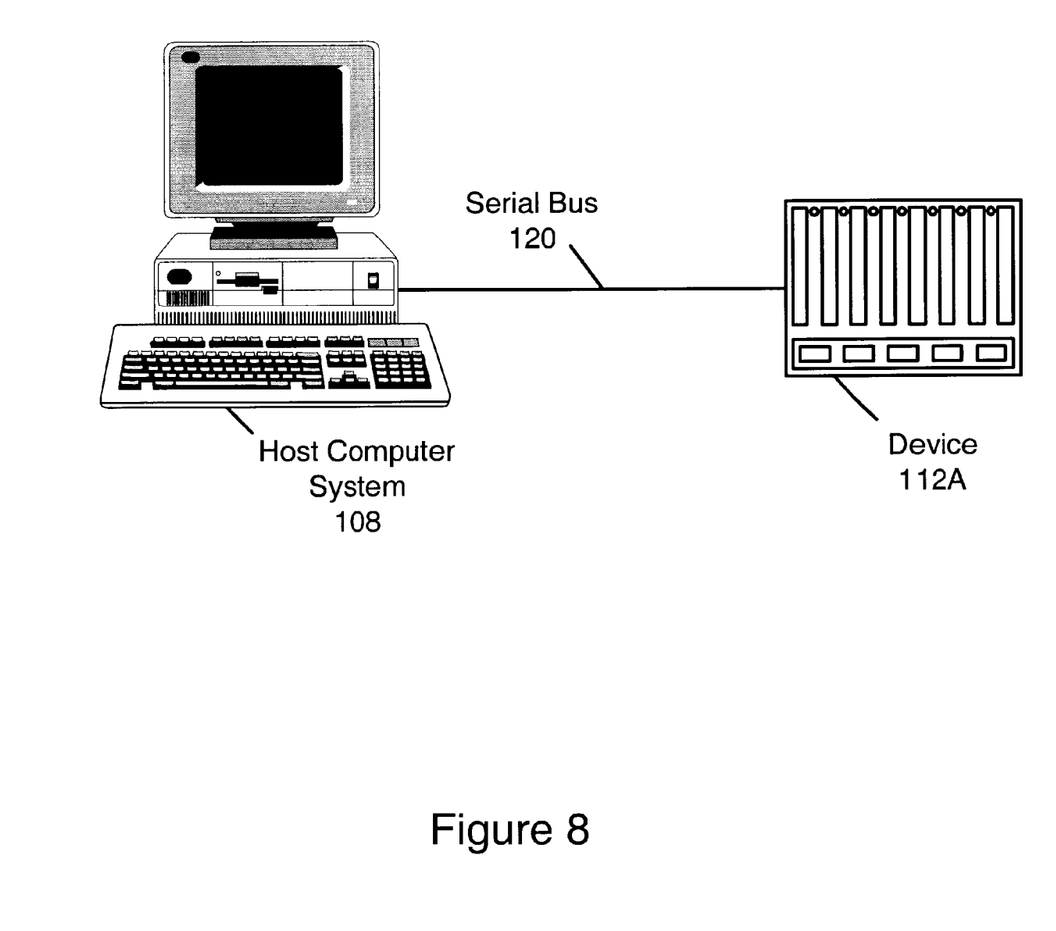
FIG. 8 illustrates a system according to an alternate embodiment, wherein the system includes a host computer which couples to a device.

FIG. 8: Alternate Embodiment

In an alternate embodiment, the system may comprise host computer system 108 which couples through a bus 120, such as a serial bus, to a device 112A. The host computer system 108 executes a first portion of a device driver for communicating with the device and the device executes a second portion of the device driver. In this embodiment, the host computer system 108 executes one or more layers of the device driver, including the algorithm layer of the device driver, and the device 112A executes hardware access routines for accessing the hardware registers on the device 112A. Thus, as with the embodiment described above, the device may include a relatively inexpensive processor and a relatively small amount of memory, and accordingly the device may be relatively inexpensive. In addition, the first driver portion executing on the host computer 108 may operate to package related low level commands into a single frame or packet and provide this single frame or packet to the device 112A. The first driver portion executing on the host computer 108 may further operate to package related low level commands into a single frame using only a single user mode/kernel mode context switch. Thus, this embodiment may operate to provide a relatively inexpensive device 112A while providing the advantages of reduced bus transactions and reduced user mode/kernel mode context switches.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A system for communicating with a device, the system comprising:

a host computer system, wherein the host computer system includes a host CPU and a host memory, wherein the host memory stores a user application, a serial bus interface driver, and a first portion of an interface driver, wherein the host computer further comprises a serial bus host controller;

a serial bus coupled to the serial bus host controller; and a serial bus interface coupled to the serial bus, wherein the serial bus interface is adapted to couple to the device through an interface bus, wherein the serial bus interface is operable to execute a second portion of the interface driver, and wherein the serial bus interface is operable to communicate signals over the interface bus to the device in response to said execution of the second portion of the interface driver;

wherein the first portion of the interface driver includes an interface algorithms layer for executing algorithms to control the device; and wherein the second portion of the interface driver includes hardware access routines for accessing registers on the serial bus interface.

2. The system of claim 1, wherein the second portion of the interface driver includes only the hardware access routines for accessing registers on the device.

3. The system of claim 1, wherein the second portion of the interface driver does not include any interface algorithms; and wherein the second portion of the interface driver further includes limited hardware configuration information.

4. The system of claim 1,
wherein the first portion of the interface driver is executable to create a frame comprising a plurality of interface commands;
wherein the serial bus host controller is operable to send the frame over the serial bus to the serial bus interface;
wherein the serial bus interface is operable to execute the second portion of the interface driver to execute the plurality of interface commands comprised in the frame to access registers on the serial bus interface.

5. The system of claim 4,
wherein the serial bus host controller is operable to send the frame over the serial bus in a single serial bus transfer.

6. The system of claim 4,
wherein the user application is executable to generate an API function call;
wherein the first portion of an interface driver receives the API function call and generates the plurality of interface commands.

7. The system of claim 6,
wherein the first portion of the interface driver requires a reduced number of user mode/kernel mode transitions in generating the plurality of interface commands.

8. The system of claim 6,
wherein the first portion of the interface driver requires a single user mode/kernel mode transition in generating the plurality of interface commands.

9. The system of claim 4,
wherein the serial bus interface is operable to:
detect an event from the device;
construct a response frame in response to the event; and
transfer the response frame to the serial bus host controller.

10. The system of claim 4,
wherein at least one of the plurality of interface commands generates an error;
wherein the serial bus interface is operable to prepare and transmit information regarding the error to the host computer system.

11. The system of claim 1, further comprising:
the interface bus; and
the device coupled to the interface bus.

12. The system of claim 11, wherein the interface bus is a General Purpose Interface Bus (GPIB).

13. The system of claim 12, wherein the serial bus interface is operable to perform autopolling on devices connected to the interface bus.

14. The system of claim 13,
wherein a plurality of GPIB devices are coupled to the interface bus;
wherein a first GPIB device is operable to assert a service request line on the GPIB;
wherein the serial bus interface is operable to poll each of the GPIB devices and provide autopoll results across the serial bus to the host computer system; and
wherein the first portion of the interface driver is executable to analyze the autopoll results and determine which GPIB device asserted the service request line.

15. The system of claim 1, wherein the serial bus comprises a Universal Serial Bus (USB), and wherein the serial bus host controller comprises a USB host controller.

16. A method for communicating with a device in a system comprising a host computer system including a serial bus host controller, a serial bus coupled to the serial bus host controller, and a serial bus interface coupled to the serial as bus, wherein the serial bus interface couples to an interface bus, wherein the device is coupled to the interface bus, the method comprising:
a user application executing on the host computer generating an API function call;
a first portion of an interface driver executing on the host computer receiving the API function call and generating a plurality of interface commands;
the first portion of the interface driver creating a frame comprising the plurality of interface commands;
the serial bus host controller sending the frame over the serial bus to the serial bus interface;
the serial bus interface receiving the frame over the serial bus;
the serial bus interface executing the second portion of the interface driver to execute the plurality of interface commands comprised in the frame; and
the serial bus interface transmitting signals over the interface bus to the device in response to executing the plurality of interface commands.

17. The method of claim 16,
wherein the serial bus interface executing the second portion of the interface driver to execute the plurality of interface commands comprises:
hardware access routines unpacking the frame to retrieve the plurality of interface commands and executing the commands to read/write registers on the interface chip;
wherein the hardware access routines are stored and executed in the serial bus interface.

18. The method of claim 16,
wherein the serial bus host controller sending the frame over the serial bus to the serial bus interface is performed in a single serial bus transfer.

19. The method of claim 16,
wherein the first portion of the interface driver generating the plurality of interface commands requires a reduced number of user mode/kernel mode transitions.

20. The method of claim 16, further comprising:
the serial bus interface detecting an event from the device;
the serial bus interface constructing a response frame in response to the event; and
the serial bus interface transferring the response frame to the serial bus host controller.

21. The method of claim 16, further comprising:
at least one of the plurality of interface commands generating an error; and
the serial bus interface preparing and transmitting information regarding the error to the host computer system.

22. The method of claim 16, wherein the second portion of the interface driver includes only hardware access routines and limited hardware configuration information.

23. The method of claim 16, further comprising the serial bus interface storing serial bus configuration information.

24. The method of claim 16,
wherein the second portion of the interface driver does not include interface algorithms.

25. The method of claim 16, wherein the serial bus comprises a USB, and wherein the serial bus host controller comprises a USB host controller.

26. The method of claim 16, wherein the interface bus comprises a General Purpose Interface Bus (GPIB).

27. The method of claim 26, further comprising:
the serial bus interface performing autopolling on devices connected to the GPIB.

28. The method of claim 27,
wherein a plurality of GPIB devices are coupled to the interface bus; the method further comprising:
a first GPIB device asserting a service request line on the GPIB;
the serial bus interface polling each of the GPIB devices and providing autopoll results across the serial bus to the host computer system; and
the first portion of the interface driver executing to analyze the autopoll results and determine which GPIB device asserted the service request line.

29. A system for communicating with a device, the system comprising:
a host computer system, wherein the host computer system includes a host CPU and a host memory, wherein the host memory stores a user application, a USB interface driver, and a first portion of an interface driver, wherein the host computer further comprises a USB host controller;
a USB coupled to the USB host controller;
a USB interface coupled to the USB, wherein the USB interface is adapted to couple to the device through an interface bus, wherein the USB interface is operable to execute a second portion of the interface driver, and wherein the USB interface is operable to communicate signals over the interface bus to the device in response to said execution of the second portion of the interface driver;
wherein the first portion of the interface driver includes an interface algorithms layer for executing algorithms to control the device; and
wherein the second portion of the interface driver includes hardware access routines for accessing registers on the serial bus interface;
wherein the first portion of the interface driver is executable to create a frame comprising a plurality of interface commands;
wherein the USB host controller is operable to send the frame over the serial bus to the USB interface;
wherein the USB interface is operable to execute the second portion of the interface driver to execute the plurality of interface commands comprised in the frame to access registers on the USB interface.

30. A system for communicating with a device, the system comprising:
a host computer system, wherein the host computer system includes a host CPU and a host memory, wherein the host memory stores a user application, a serial bus interface driver, and a first portion of a device driver, wherein the host computer further comprises a serial bus host controller;
a serial bus coupled to the serial bus host controller;
a device coupled to the serial bus, wherein the device is operable to execute a second portion of the device driver, and wherein the device is operable to perform a function in response to said execution of the second portion of the device driver.

31. The system of claim 30,
wherein the first portion of the interface driver includes an interface algorithms layer for executing algorithms to control the device; and
wherein the second portion of the interface driver includes hardware access routines for accessing registers on the serial bus interface.

32. The system of claim 30,
wherein the first portion of the device driver is executable to create a frame comprising a plurality of driver commands;
wherein the serial bus host controller is operable to send the frame over the serial bus to the device;
wherein the device is operable to execute the second portion of the device driver to execute the plurality of driver commands comprised in the frame.

33. The system of claim 32,
wherein the serial bus host controller is operable to send the frame over the serial bus in a single serial bus transfer.

34. A system for communicating with a device, the system comprising:
a host computer system, wherein the host computer system includes a host CPU and a host memory, wherein the host memory stores a user application and a first portion of an interface driver, wherein the host computer further comprises a host controller;
a first bus coupled to the host controller; and
an interface coupled to the first bus, wherein the interface is adapted to couple to the device through an interface bus, wherein the interface is operable to execute a second portion of the interface driver, and wherein the interface is operable to communicate signals over the interface bus to the device in response to said execution of the second portion of the interface driver;
wherein the first portion of the interface driver includes an interface algorithms layer for executing algorithms to control the device; and
wherein the second portion of the interface driver includes hardware access routines for accessing registers on the interface.

35. The system of claim 34, wherein the second portion of the interface driver includes only the hardware access routines for accessing registers on the device.

36. The system of claim 34,
wherein the second portion of the interface driver does not include any interface algorithms; and
wherein the second portion of the interface driver includes limited hardware configuration information.

37. The system of claim 34,
wherein the first portion of the interface driver is executable to create a frame comprising a plurality of interface commands;
wherein the host controller is operable to send the frame over the first bus to the interface;
wherein the interface is operable to execute the second portion of the interface driver to execute the plurality of interface commands comprised in the frame to access registers on the interface.

38. The system of claim 34, wherein the first bus is a serial bus.

39. A system for communicating with a device, the system comprising:
a host computer system, wherein the host computer system includes a host CPU and a host memory, wherein the host memory stores a user application, a serial bus interface driver, and a first portion of an interface driver, wherein the host computer further comprises a serial bus host controller;
a serial bus coupled to the serial bus host controller; and
a serial bus interface coupled to the serial bus, wherein the serial bus interface is adapted to couple to the device through an interface bus, wherein the serial bus interface is operable to execute a second portion of the interface driver, and wherein the serial bus interface is operable to communicate signals over the interface bus to the device in response to said execution of the second portion of the interface driver;

wherein the first portion of the interface driver is executable to create a frame comprising a plurality of interface commands;

wherein the serial bus host controller is operable to send the frame over the serial bus to the serial bus interface;

wherein the serial bus interface is operable to execute the second portion of the interface driver to execute the plurality of interface commands comprised in the frame to access registers on the serial bus interface.

40. The system of claim 39,
wherein the serial bus host controller is operable to send the frame over the serial bus in a single serial bus transfer.

41. The system of claim 39,
wherein the user application is executable to generate an API function call;
wherein the first portion of an interface driver receives the API function call and generates the plurality of interface commands.

42. The system of claim 41,
wherein the first portion of the interface driver requires a reduced number of user mode/kernel mode transitions in generating the plurality of interface commands.

43. The system of claim 41,
wherein the first portion of the interface driver requires a single user mode/kernel mode transition in generating the plurality of interface commands.

44. The system of claim 39,
wherein the serial bus interface is operable to:
detect an event from the device;
construct a response frame in response to the event; and
transfer the response frame to the serial bus host controller.

45. The system of claim 39,
wherein at least one of the plurality of interface commands generates an error;
wherein the serial bus interface is operable to prepare and transmit information regarding the error to the host computer system.

46. A system for communicating with a device, the system comprising:
a host computer system, wherein the host computer system includes a host CPU and a host memory, wherein the host memory stores a user application, a serial bus interface driver, and a first portion of an interface driver, wherein the host computer further comprises a serial bus host controller;
a serial bus coupled to the serial bus host controller; and
a serial bus interface coupled to the serial bus, wherein the serial bus interface is adapted to couple to the device through an interface bus, wherein the serial bus interface is operable to execute a second portion of the interface driver, and wherein the serial bus interface is operable to communicate signals over the interface bus to the device in response to said execution of the second portion of the interface driver;
wherein the first portion of the interface driver includes an interface algorithms layer for executing algorithms to control the device; and wherein the second portion of the interface driver includes hardware access routines for accessing registers on the serial bus interface;

wherein the first portion of the interface driver is executable to create a frame comprising a plurality of interface commands;

wherein the serial bus host controller is operable to send the frame over the serial bus to the serial bus interface;

wherein the serial bus interface is operable to execute the second portion of the interface driver to execute the plurality of interface commands comprised in the frame to access registers on the serial bus interface.

47. The system of claim 46,
wherein the serial bus host controller is operable to send the frame over the serial bus in a single serial bus transfer.

48. The system of claim 46,
wherein the user application is executable to generate an API function call;
wherein the first portion of an interface driver receives the API function call and generates the plurality of interface commands.

49. The system of claim 48,
wherein the first portion of the interface driver requires a reduced number of user mode/kernel mode transitions in generating the plurality of interface commands.

50. The system of claim 48,
wherein the first portion of the interface driver requires a single user mode/kernel mode transition in generating the plurality of interface commands.

51. The system of claim 46,
wherein the serial bus interface is operable to:
detect an event from the device;
construct a response frame in response to the event; and
transfer the response frame to the serial bus host controller.

52. The system of claim 46,
wherein at least one of the plurality of interface commands generates an error;
wherein the serial bus interface is operable to prepare and transmit information regarding the error to the host computer system.

53. A system for communicating with a device, the system comprising:
a host computer system, wherein the host computer system includes a host CPU and a host memory, wherein the host memory stores a user application, a serial bus interface driver, and a first portion of a GPIB driver, wherein the host computer further comprises a serial bus host controller;
a serial bus coupled to the serial bus host controller; and
a serial bus interface coupled to the serial bus, wherein the serial bus interface is adapted to couple to the device through a GPIB bus, wherein the serial bus interface is operable to execute a second portion of the GPIB driver, and wherein the serial bus interface is operable to communicate signals over the GPIB bus to the device in response to said execution of the second portion of the GPIB driver;
wherein the serial bus interface is operable to perform autopolling on devices connected to the GPIB bus;
wherein a plurality of GPIB devices are coupled to the GPIB bus;
wherein a first GPIB device is operable to assert a service request line on the GPIB bus;

wherein the serial bus interface is operable to poll each of the GPIB devices and provide autopoll results across the serial bus to the host computer system; and wherein the first portion of the GPIB driver is executable to analyze the autopoll results and determine which GPIB device asserted the service request line.

54. A method for communicating with a device in a system comprising a host computer system including a serial bus host controller, a serial bus coupled to the serial bus host controller, and a serial bus interface coupled to the serial bus, wherein the serial bus interface couples to a GPIB bus, wherein at least one GPIB device is coupled to the GPIB bus, the method comprising:

- a user application executing on the host computer generating an API function call;
- a first portion of a GPIB driver executing on the host computer receiving the API function call and generating a plurality of interface commands;
- the first portion of the GPIB driver creating a frame comprising the plurality of interface commands;
- the serial bus host controller sending the frame over the serial bus to the serial bus interface;
- the serial bus interface receiving the frame over the serial bus;
- the serial bus interface executing a second portion of the GPIB driver to execute the plurality of interface commands comprised in the frame; and
- the serial bus interface transmitting signals over the GPIB bus to the device in response to executing the plurality of interface commands.

55. The method of claim 54, further comprising:

the serial bus interface performing autopolling on devices connected to the GPIB bus.

56. The method of claim 55, wherein a plurality of GPIB devices are coupled to the GPIB bus; the method further comprising:
- a first GPIB device asserting a service request line on the GPIB;
- the serial bus interface polling each of the GPIB devices and providing autopoll results across the serial bus to the host computer system; and
- the first portion of the interface driver executing to analyze the autopoll results and determine which GPIB device asserted the service request line.

* * * * *